United States Patent [19]

Meylor et al.

[11] Patent Number: 4,971,691

[45] Date of Patent: Nov. 20, 1990

[54] QUICK CHANGE SLUDGE PROCESSOR

[76] Inventors: Donald M. Meylor, 22316 Harkwood, El Toro, Calif. 92630; Patrick J. Finn, 845 Paularino Ave., Apt. E230, Costa Mess, Calif. 92626

[21] Appl. No.: 375,265

[22] Filed: Jun. 29, 1989

[51] Int. Cl.[5] .............................................. B01D 33/04
[52] U.S. Cl. .................................... 210/232; 210/239; 210/386; 210/400; 210/DIG. 3; 100/118; 100/168; 384/247; 384/428; 384/419
[58] Field of Search ............... 210/232, 236, 386, 400, 210/DIG. 3; 100/118, 153, 168; 384/247, 252, 256, 258, 259, 416, 418, 419, 428, 438, 439, 519, 583

[56] References Cited

U.S. PATENT DOCUMENTS

| | | | |
|---|---|---|---|
| 92,858 | 7/1869 | Mayo | 384/258 |
| 2,395,147 | 2/1946 | Saxe | 384/418 |
| 2,983,352 | 5/1961 | De Flora et al. | 384/419 |
| 3,459,122 | 8/1969 | Pastoors et al. | 210/386 |
| 3,699,881 | 10/1972 | Levin et al. | 210/386 |
| 3,743,100 | 7/1973 | Bahr | 210/386 |
| 3,796,317 | 3/1974 | Lippert et al. | 210/386 |
| 3,890,755 | 6/1975 | Specht | 193/35 R |
| 3,992,298 | 11/1976 | Davis | 210/401 |
| 4,159,947 | 7/1979 | Brooks et al. | 210/401 |
| 4,324,659 | 4/1982 | Titoff | 210/386 |
| 4,595,499 | 6/1986 | Kormanik et al. | 210/386 |

FOREIGN PATENT DOCUMENTS 1179518 10/1964 Fed. Rep. of Germany ...... 210/386
6048107 8/1983 Japan .
1515286 6/1978 United Kingdom ............... 210/400

Primary Examiner—W. Gary Jones
Assistant Examiner—Matthew Savage
Attorney, Agent, or Firm—Timothy T. Tyson

[57] ABSTRACT

A sludge processor is provided which enables rapid disassembly and reassembly for changing between a sludge thickener configuration and a press configuration, and for enabling rapid disassembly for cleaning in the press configuration. The processor includes a frame with opposite sides and roller-holding bearing devices at the opposite sides for holding rollers about which a belt extends past a sludge dewatering region. The bearing devices can be arranged in a first configuration (FIG. 2) wherein the belt (12A) extends in an even path, and a second configuration (FIG. 1) wherein the belt extends in a tightly convoluted path so it and material thereon is squeezed between adjacent rollers. The bearing devices (50, FIG. 4) are releasably mounted to the frame sides to enable rapid conversion, and to enable rapid removal of the rollers for cleaning the processor when used in the second configuration. Each side of the frame includes a plate with a hole (60) having a narrow inner part (64) and a wider outer part (62). Each bearing device includes a block (52) with grooves (72, 74), the block fitting into the outer hole part and then sliding into the inner hole part, with the opposite walls of the inner hole part sliding into the grooves of the block. A clamp (82) can be attached to each block to press against the extreme outer side of the hole to hold the bearing device in position.

6 Claims, 2 Drawing Sheets

QUICK CHANGE SLUDGE PROCESSOR

BACKGROUND OF THE INVENTION

Sludge, which includes solid material and considerable water, can be continually processed by placing it on a belt where it is vibrated to spread it and encourage gravitational drainage through the belt and capillary drainage from the inside of the sludge to the under surface of the belt, to thereby thicken the sludge. Further continuous processing can be accomplished by placing the thickened sludge on a cloth belt that passes in a convoluted path between rollers which squeeze the sludge lying on the belt. The pressing operation requires occasional removal of the belt to clean it and the rollers, so after reassembly the apparatus can operate efficiently. A processing apparatus that enabled a single processor to be readily changed between configurations useful for dewatering or pressing, and which also facilitated rapid disassembly of the rollers and belt in the pressing configuration for cleaning and rapid reassembly, would be of considerable value.

SUMMARY OF THE INVENTION

In accordance with one embodiment of the present invention, a sludge processor is provided which can be easily disassembled for conversion to different configurations or for cleaning before reassembly into the same configuration. A processor that can operate in different configurations includes a frame with opposite sides having bearing mount positions at which bearing devices can be mounted that hold rollers about which a belt extends. The bearing devices are arrangeable in a first configuration to hold a belt so a belt portion that extends along a sludge dewatering region extends in an even path to thicken the sludge. The bearing devices are also arrangeable in a second configuration wherein a belt extends in a convoluted path in which the belt and material thereon is squeezed between adjacent rollers. In order to facilitate removal of bearing devices, either to change the configuration of the processor or to enable disassembly for cleaning and reassembly in the same configuration, the bearing devices are mounted for rapid disassembly and reassembly.

The frame can be formed with plates at its opposite sides, with each plate having holes in which the bearing devices are mounted. Each hole has an outer part in which a block of a bearing device is received, and a narrower inner part. The block has grooves at its opposite sides which slideably receive the opposite walls of the inner part of the hole, so the block can be inserted into the wider outer hole portion and then slid into the narrower inner hole portion A clamp can be attached to the installed block, the clamp having a member that bears against the extreme outer end of the hole to hold the block and the bearing therein in place.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
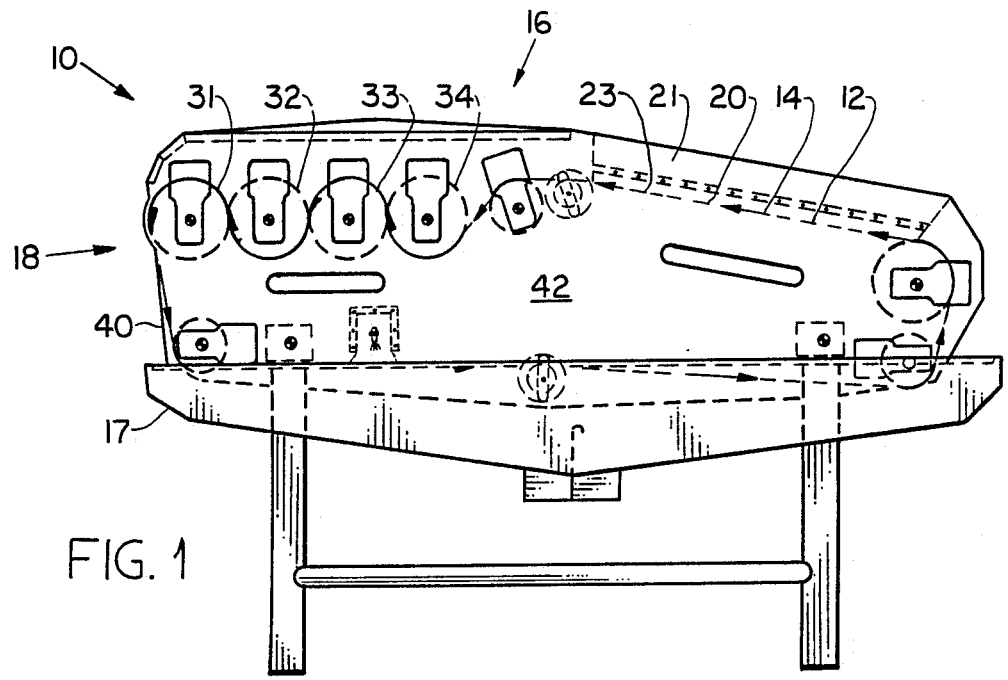
FIG. 1 is a simplified side elevation view of a sludge processor constructed in accordance with the present invention, showing it in a press configuration wherein it tightly presses the sludge to dewater it, but with the bearing devices not shown.
Figure 2:
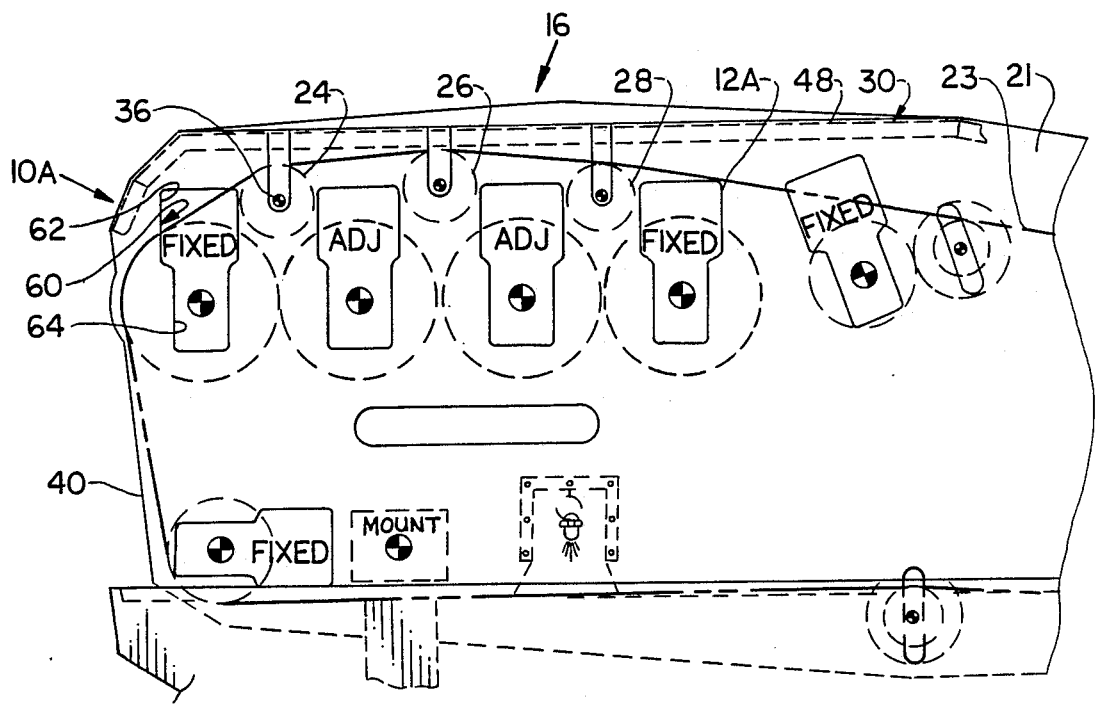
FIG. 2 is a partial side elevation view of the processor of FIG. 1, in another configuration wherein the processor is used to thicken sludge but not tightly compress it

FIG. 1 illustrates a sludge processor 10 for processing sludge to remove water therein. The sludge is dumped onto a receiving portion 20 of a belt 12 that moves in a looped path 14 that includes a sludge dewatering region 16 where water is removed to fall into a pan 17. The path also includes a dump portion 18 where the sludge is dumped for further processing, and past cleaning drive portions back to the receiving portion 20 which lies at a receiving location 21 is received on the top side 23 of the belt. The processor can be operated in a first configuration shown at 10A in FIG. 2, for thickening sludge. In that configuration, a thickener belt 12A extends in an "even" path that is devoid of sharp curves (curves of much over 90° around a single roller), to merely allow water to drain from the sludge. In that configuration, the portion of the belt extending over the sludge dewatering portions 16 extends over three small rollers 24-28 of a thickener roller assembly 30. The assembly 30 includes small bearing devices 36 located at mount locations on a support 48. In a second configuration shown in FIG. 1, which is used to squeeze water from sludge, the belt 12 extends in a convoluted path in which the belt and sludge thereon is squeezed between adjacent rollers 31-34.

Figure 3:
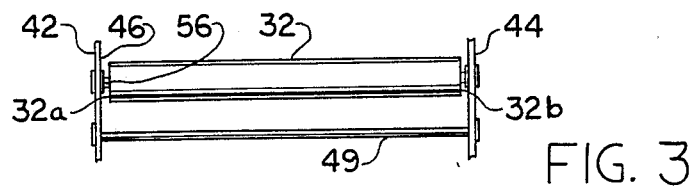
FIG. 3 is a partial plan view of the apparatus of FIG. 1, showing a bearing device.

The sludge processor 10 includes a frame 40 that has opposite sides 42, 44 (FIG. 3) at opposite ends 32a, 32b of the rollers. Each side is formed of a plate 46, with the plates at the two sides maintained parallel and at a controlled spacing by a group of spacer rods 49. With the processor in the first configuration of FIG. 2, it can be changed to the second configuration by removing the belt 12A, as by unfastening the belt ends from each other, and lifting off the roller assembly 30 with the rollers 24-28 thereon that are mounted on a support 48 that lies on the top of the frame 40 on its opposite side plates 42, 44. Then the squeeze belt 12 is installed so it extends in the path shown in FIG. 1. To facilitate installation of the belt in the second configuration of FIG. 1, the rollers 32, 33 may be removed and/or adjusted in position When operated in the second configuration of FIG. 1, for tightly squeezing the sludge on the belt that carries it, removal and cleaning of the belt is often required, as to removed sludge embedded in the belt. The squeezing rollers 31-34 are mounted to facilitate their removal and replacement and also their adjustment in position.

Figure 4:
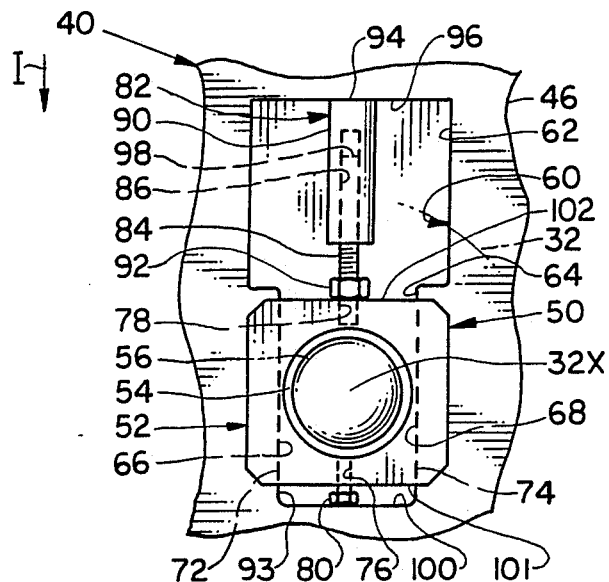
FIG. 4 is a side elevation view of the apparatus of FIG. 1, showing a bearing device in place.
Figure 5:
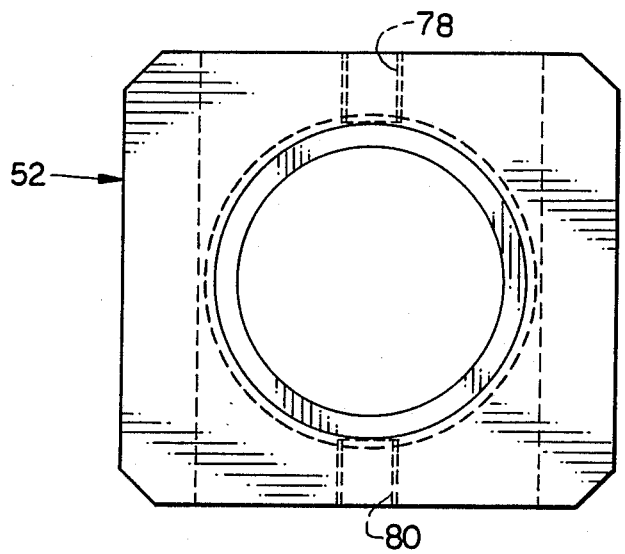
FIG. 5 is a front elevation view of the bearing block of FIG. 4.
Figure 6:
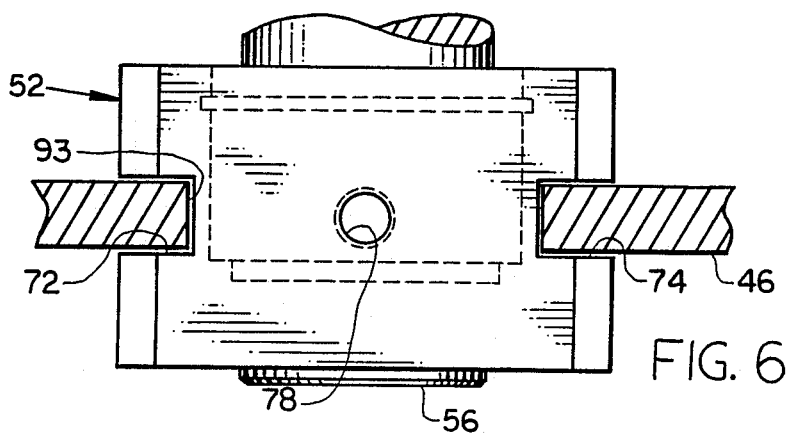
FIG. 6 is a plan view of the bearing block of FIG. 5, showing it installed on a plate of the frame of FIG. 1.

FIG. 4 illustrates a bearing device 50 that rotatably supports one of the rollers 32 at a bearing mount position indicated by roller axis 32X. The bearing device includes a bearing block 52 which holds a bearing 54 (of a type that may include balls, rollers, low friction sliding material, etc.) that rotatably supports a shaft 56 of the roller. The bearing block lies in a hole 60 formed in the plate 46 of the processor frame 40. The hole 60 is a "closed" hole, in that the walls of the hole completely surround the hole, which helps avoid considerable weakening of the upper part of each frame side. The hole 60 has outer and inner parts 62, 64, with the inner part 64 being narrower than the outer part. The inner part 64 has primarily parallel hole side walls 66, 68, and the bearing block 52 has parallel grooves 72, 74 that receive the side walls of the inner part of the hole The hole outer part 62 is large enough, so that the bearing block 52 by itself can fit into the outer part 62 of the hole, and then can be slid inwardly, in the direction of arrow I, to the position shown in FIG. 4.

The bearing block has threaded holes 76, 78 at its inner and outer ends 101, 102. A threaded adjuster 80 is threadably engaged in the inner threaded hole 76, and has a hexagonal part that can be turned to vary the effective length of the adjuster, to adjust the height, or inward-outward position of the bearing block in the hole. The bearing device also includes a clamp 82 that holds the bearing block closely in position in the plate hole.

The clamp 82 includes a threaded stud 84 with an inner end received in the threaded hole 78 of the bearing block and with an outer end received in a threaded hole 86 of a clamp member 90. A nut 92 is used to lock the stud relative to the bearing block 52.

The bearing device 50 is installed by screwing the adjuster 80 into the inner hole in the bearing block and inserting the bearing block into the wide outer part 62 of the plate hole 60, by moving the block normal to the plane of the plate (one groove in the block can be first inserted around a side of the outer hole part). The bearing block is then slid inwardly, in the direction of arrow I, with the grooves in the bearing block receiving the opposite side walls 93 of the inner hole part. The stud 84 is screwed all the way into the clamp member 90 and the nut 92 is installed on it. The inner end of the stud is then screwed into the threaded hole 78 of the bearing block. Then the clamp member 90 is turned so that its outer end 94 moves outwardly against an outer wall 96 of the plate hole 60. At that time, the outer end 98 of the threaded stud will lie at the position shown in FIG. 4. The nut 92 can be tightened against the outer end of the bearing block 52. The bearing block can be adjusted in inward-outward directions by turning the adjuster 80 and the clamp member 90, to hold the bearing block securely at any distance from the inner end 100 of the hole, to adjust the distance between adjacent rollers.

The bearing device can be rapidly removed by removing the clamp 82, sliding the bearing block 52 to the outer part 62 of the hole, and pulling the bearing block out of the hole and out of the end of the shaft of the roller. After the bearing devices are removed, the rollers and belt can be easily removed. The reverse procedure is used for replacement of the part. The ability to rapidly remove and replace the bearing devices, and to hold them at closely adjustable positions, and in a secure manner, facilitates maintenance of the processor.

Thus, the invention provides a sludge processor which can be readily changed between a sludge thickener configuration and a sludge press configuration. The rollers which hold a belt in the sludge thickener configuration are mounted on a roller assembly at the top of the frame of the apparatus, and can be readily lifted off, to allow mounting a belt around rollers lying thereunder. The rollers used for sludge pressing are mounted on roller devices that can be easily removed and replaced to facilitate maintenance of the processor.

The bearing devices include bearing blocks with grooves and can be installed in holes in side plates of the frame, by projecting the bearing block into a Wide outer end of the hole and then sliding the bearing block inwardly so grooves at opposite sides of the bearing block receive side walls of the narrower inner hole portion. A clamp can then be installed on the bearing block and the clamp moved tightly against an outer end of the hole walls. The bearing device which can hold an end of a roller and which can be readily removed and replaced in a hole in a plate, is useful in a variety of applications.

Although particular embodiments of the invention have been described and illustrated herein, it is recognized that modifications and variations may readily occur to those skilled in the art and consequently it is intended to cover such modifications and equivalents.

What is claimed is:

1. A sludge processor comprising:
   a frame having opposite frame sides and having a receiving location where sludge is received;
   a plurality of bearing devices on said frame;
   a plurality of rollers, each rotatably mountable on a pair of said bearing devices;
   at least one belt which can extend about said rollers;
   said frame including a support mounted on said frame sides and carrying a first group of said bearing devices that support a first group of said rollers with said belt thereon in a first configuration wherein a portion of said belt has a top side and extends past said receiving location where sludge can be placed on said top side, and along a sludge dewatering region in an even path with said top side uppermost to allow fluid to flow out of the sludge to thicken the sludge, said frame sides holding another group of said bearing devices that support another group of said rollers with said belt in an alternate second group of said rollers with said belt in an alternate second configuration wherein said belt extends past said receiving location where it receives sludge on its top side and then extends in a convoluted path in which the belt and any sludge thereon is squeezed between adjacent rollers.

2. The sludge processor described in claim 1 wherein:
   at least one side of said frame comprises a plate with a plurality of holes with each hole surrounded by said plate, each hole including an inner part with a pair of largely parallel opposite sides and an outer part;
   each of said another group of said bearing devices includes a bearing block and a bearing located in the block, each block having opposite sides with substantially parallel grooves therein that closely receive said opposite sides of said hole inner part;
   each hole outer part being wider than said inner part and wide enough to receive said block so it can be slid inwardly into said hole inner part.
   each of said another group of said bearing devices comprises a clamp that includes a threaded stud threadably engaged with a corresponding one of said blocks, said clamp also including a clamp member engaged with said stud, said clamp member having an outer end bearing against an outer wall of a corresponding one of said holes.

3. In a sludge processor that includes a sludge-carrying belt extending about a plurality of rollers that have opposite ends, a frame with opposite sides, a plurality of bearing devices mounted on each of said frame sides, and a plurality of rollers having shafts rotatably mounted on said bearing devices and supporting said belt, the improvement wherein:

said frame sides include a pair of plates each having a plurality of plate holes with inner and outer parts, said inner hole part having a pair of substantially parallel opposite sides;

each of a plurality of said bearing devices includes a bearing block and a bearing mounted in said block and engaging an end of said roller, each of said blocks having a pair of opposite sides with grooves therein that closely receive said parallel sides of said inner hole part;

each of said outer parts of said plate holes being wider than the inner part of the hole, and each outer part of said plate hole is wide enough to receive a corresponding one of said blocks when the block is moved largely normal to the plate into the hole outer part, so the block then can be slid into the inner hole part;

each of a plurality of said holes has and outer wall at the outer end of the outer hole part; and each of a plurality of said bearing devices includes a clamp with an inner end engaged with the outer end of said block and an outer end bearing against said outer end of said outer hole part.

4. An apparatus which includes at least one roller or other rotatable member with opposite ends mounted by bearing devices on opposite sides of a frame, the improvement wherein:

a first side of said frame includes a plate with a hole that includes a wider outer part and a narrower inner part having primarily parallel opposite side walls;

said bearing device includes a bearing block with a bearing therein that supports an end of said rotatable member, said bearing block having sides with primarily parallel grooves that closely receive said opposite side walls of said inner hole part;

said outer hole part being wide enough to receive said bearing block so it can be slid into said narrower inner hole part;

said outer hole part has an outer wall;

said bearing device comprises a clamp having an inner portion engaged with said bearing block and an outer portion engaged with said outer wall of said hole, and said clamp pressing said bearing block and outer wall away from each other.

5. The improvement described in claim 7 wherein:

said inner hole part has an inner wall and said block has an inner end;

said clamp is of variable length;

said bearing device includes an adjuster of variable length which has an outer end engaged with the inner end of said block and an inner end engaged with said inner wall of said inner hole part.

6. In a sludge processor that includes a sludge-carrying belt extending about a plurality of rollers that have opposite ends, a frame with opposite sides, a plurality of bearing devices mounted on each of said frame sides, and a plurality rollers having shafts rotatably mounted on said bearing devices and supporting said belt, the improvement wherein:

said frame sides include a pair of plates each having a plurality of plate holes with inner and outer parts, said inner hole part having a pair of substantially parallel opposite sides;

each of a plurality of said bearing devices includes a bearing block and a bearing mounted in said block and engaging an end of said roller, each of said blocks having a pair of opposite sides with grooves therein that closely receive said parallel sides of said inner hole part; 'each of said outer parts of said plate holes being wider than the inner part of the hole, and each outer part of a hole is wide enough to receive a corresponding one of said blocks when the block is moved largely normal to the plate into the hole outer part, so the block then can be slid into the inner hole part;

each of a plurality of said holes has inner and outer walls respectively at said inner and outer hole parts, and each of said blocks includes inner and outer ends;

each of a plurality of said bearing devices includes a clamp with an inner end engaged with the outer end of said block and an outer end bearing against said outer wall of said outer hole part; and each of a plurality of said bearing devices also includes an adjuster of variable length which has an outer end engaged with the inner end of said block and an inner end bearing against said inner wall of said inner hole part.

* * * * *